US012811067B2

(12) United States Patent
Doi

(10) Patent No.: US 12,811,067 B2
(45) Date of Patent: Nov. 24, 2026

(54) MULTILAYER CERAMIC CAPACITOR

(71) Applicant: Murata Manufacturing Co., Ltd., Nagaokakyo (JP)

(72) Inventor: Akitaka Doi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 146 days.

(21) Appl. No.: 18/783,751

(22) Filed: Jul. 25, 2024

(65) Prior Publication Data

US 2024/0379293 A1 Nov. 14, 2024

Related U.S. Application Data

(63) Continuation of application No. 17/979,030, filed on Nov. 2, 2022, now Pat. No. 12,080,487.

(30) Foreign Application Priority Data

Dec. 23, 2021 (JP) ................................ 2021-209093

(51) Int. Cl.
*H01G 4/30* (2006.01)
*H01G 4/008* (2006.01)
*H01G 4/12* (2006.01)

(52) U.S. Cl.
CPC ............... *H01G 4/30* (2013.01); *H01G 4/008* (2013.01); *H01G 4/1227* (2013.01)

(58) Field of Classification Search
CPC ......... H01G 4/30; H01G 4/008; H01G 4/1227
See application file for complete search history.

(56) References Cited

U.S. PATENT DOCUMENTS

2001/0016252 A1 8/2001 Nagamoto et al.
2007/0242416 A1* 10/2007 Saito .................... H01G 4/2325 361/321.1
2013/0120898 A1* 5/2013 Park .......................... H01G 4/30 252/514

(Continued)

FOREIGN PATENT DOCUMENTS

CN 1308342 A 8/2001
CN 106298239 A 1/2017

OTHER PUBLICATIONS

DOI, "Multilayer Ceramic Capacitor", U.S. Appl. No. 17/979,030, filed Nov. 2, 2022.

(Continued)

*Primary Examiner* — Michael P Mcfadden
(74) *Attorney, Agent, or Firm* — Keating & Bennett, LLP

(57) ABSTRACT

A multilayer ceramic capacitor includes a multilayer body and a pair of external electrodes at both ends of the multilayer body in a length direction and covering a pair of end surfaces, and connected to internal electrode layers. The pair of external electrodes each include a first external electrode layer covering each of the end surfaces and connected to the internal electrode layers, a second external electrode layer on the first external electrode layer, and a plated layer on the second external electrode layer, the first external electrode layer includes Ni and dielectric particles, the second external electrode layer includes Cu and glass, and a metal group including at least one of Sn, In, Ga, Zn, Bi, Pb, Fe, V, Y, or Cu is included at an interface between the first and second external electrode layers.

19 Claims, 3 Drawing Sheets

(56) References Cited

U.S. PATENT DOCUMENTS

| | | | | |
|---|---|---|---|---|
| 2014/0233147 | A1* | 8/2014 | Hong | H01G 4/008 361/301.4 |
| 2015/0090483 | A1* | 4/2015 | Moon | H01G 4/232 29/25.42 |
| 2016/0379758 | A1 | 12/2016 | Otani | |
| 2017/0032896 | A1* | 2/2017 | Otani | H01G 4/30 |
| 2017/0301468 | A1* | 10/2017 | Kim | H01G 4/30 |
| 2018/0166215 | A1* | 6/2018 | Hamanaka | H01G 4/12 |
| 2020/0135403 | A1* | 4/2020 | Lee | H01G 4/12 |
| 2020/0312560 | A1* | 10/2020 | Onishi | H01G 4/232 |
| 2021/0057153 | A1* | 2/2021 | Jun | H01G 4/012 |
| 2023/0135148 | A1* | 5/2023 | Kang | H01G 4/232 |

OTHER PUBLICATIONS

Official Communication issued in corresponding Chinese Patent Application No. 202211169351.6, mailed on Nov. 1, 2024, 7 pages.

* cited by examiner

MULTILAYER CERAMIC CAPACITOR

CROSS REFERENCE TO RELATED APPLICATIONS

This application claims the benefit of priority to Japanese Patent Application No. 2021-209093 filed on Dec. 23, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, multilayer ceramic capacitors have been known, each including a multilayer body in which a plurality of dielectric ceramic layers and a plurality of internal electrode layers are laminated, and external electrodes disposed at both ends of the multilayer body. Some of such multilayer ceramic capacitors include plating provided on the outermost layer of each of the external electrodes. For example, Japanese Unexamined Patent Application Publication No. 2013-214714 discloses a multilayer ceramic capacitor including an intermediate layer containing at least one selected from the group consisting of Ni, Cu and a Ni—Cu alloy provided under a plated layer to prevent penetration of a plating solution.

It is important to achieve sufficient moisture resistance by the external electrodes in order to improve the reliability of the multilayer ceramic capacitor, and technology for further improving moisture resistance is required.

SUMMARY OF THE INVENTION

Preferred embodiments of the present invention provide multilayer ceramic capacitors each having sufficient moisture resistance.

A multilayer ceramic capacitor according to a preferred embodiment of the present invention includes a multilayer body including a plurality of dielectric ceramic layers and a plurality of internal electrode layers laminated alternately in a lamination direction, a pair of main surfaces opposed to each other in the lamination direction, a pair of side surfaces opposed to each other in a width direction orthogonal or substantially orthogonal to the lamination direction, and a pair of end surfaces opposed to each other in a length direction orthogonal or substantially orthogonal to the lamination direction and the width direction, and a pair of external electrodes provided at both ends of the multilayer body in the length direction to cover at least the pair of end surfaces, and connected to the internal electrode layers. The pair of external electrodes each include a first external electrode layer covering each of the end surfaces and is connected to the internal electrode layers, a second external electrode layer on the first external electrode layer, and a plated layer on the second external electrode layer, the first external electrode layer includes Ni and a dielectric region, the second external electrode layer includes Cu and glass, and at least one of Sn, In, Ga, Zn, Bi, Pb, Fe, V, Y, or Cu is included at an interface between the first external electrode layer and the second external electrode layer.

According to preferred embodiments of the present invention, it is possible to provide multilayer ceramic capacitors each having sufficient moisture resistance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
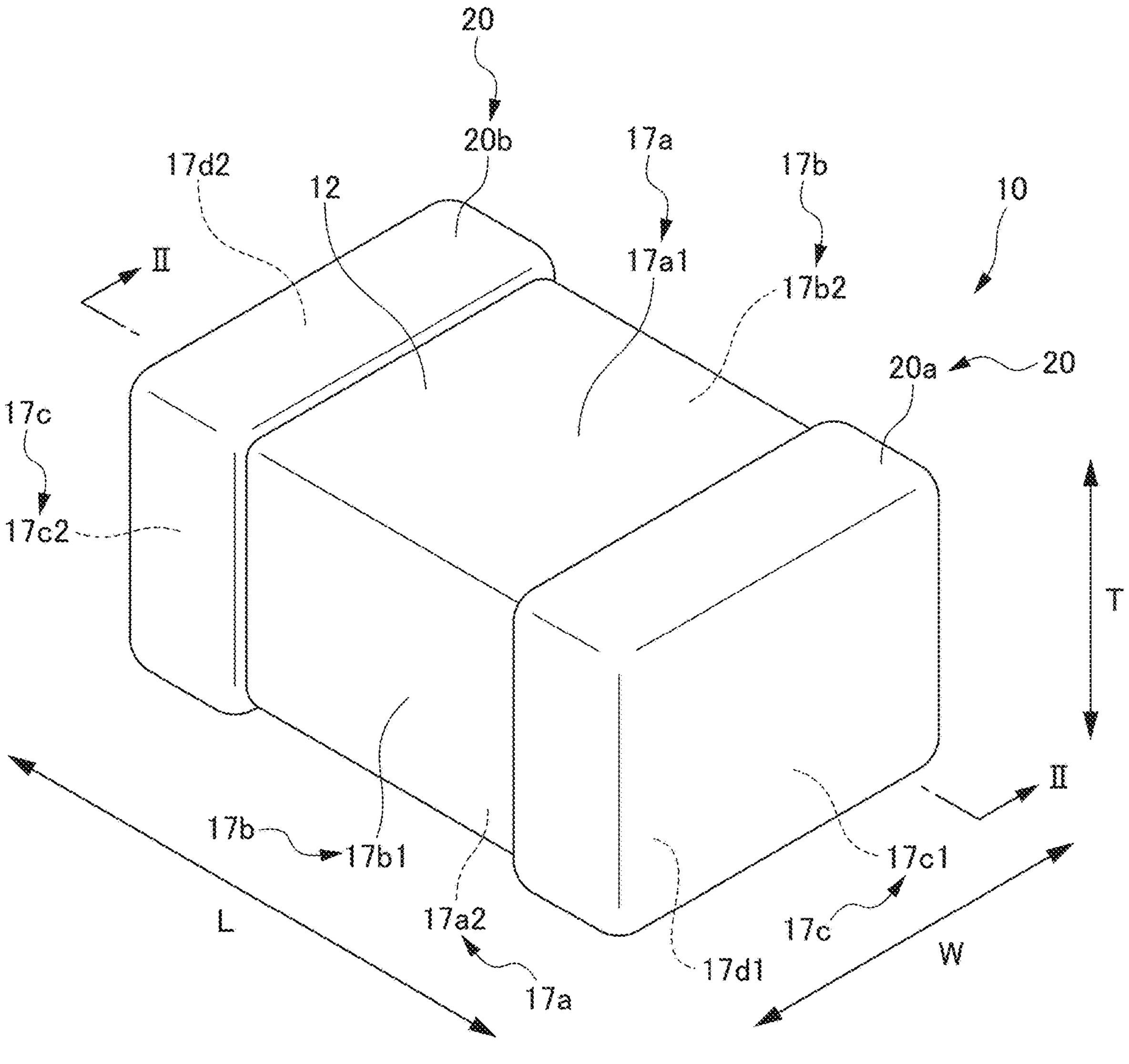
FIG. 1 is a schematic perspective view of a multilayer ceramic capacitor according to a preferred embodiment of the present invention.
Figure 2:
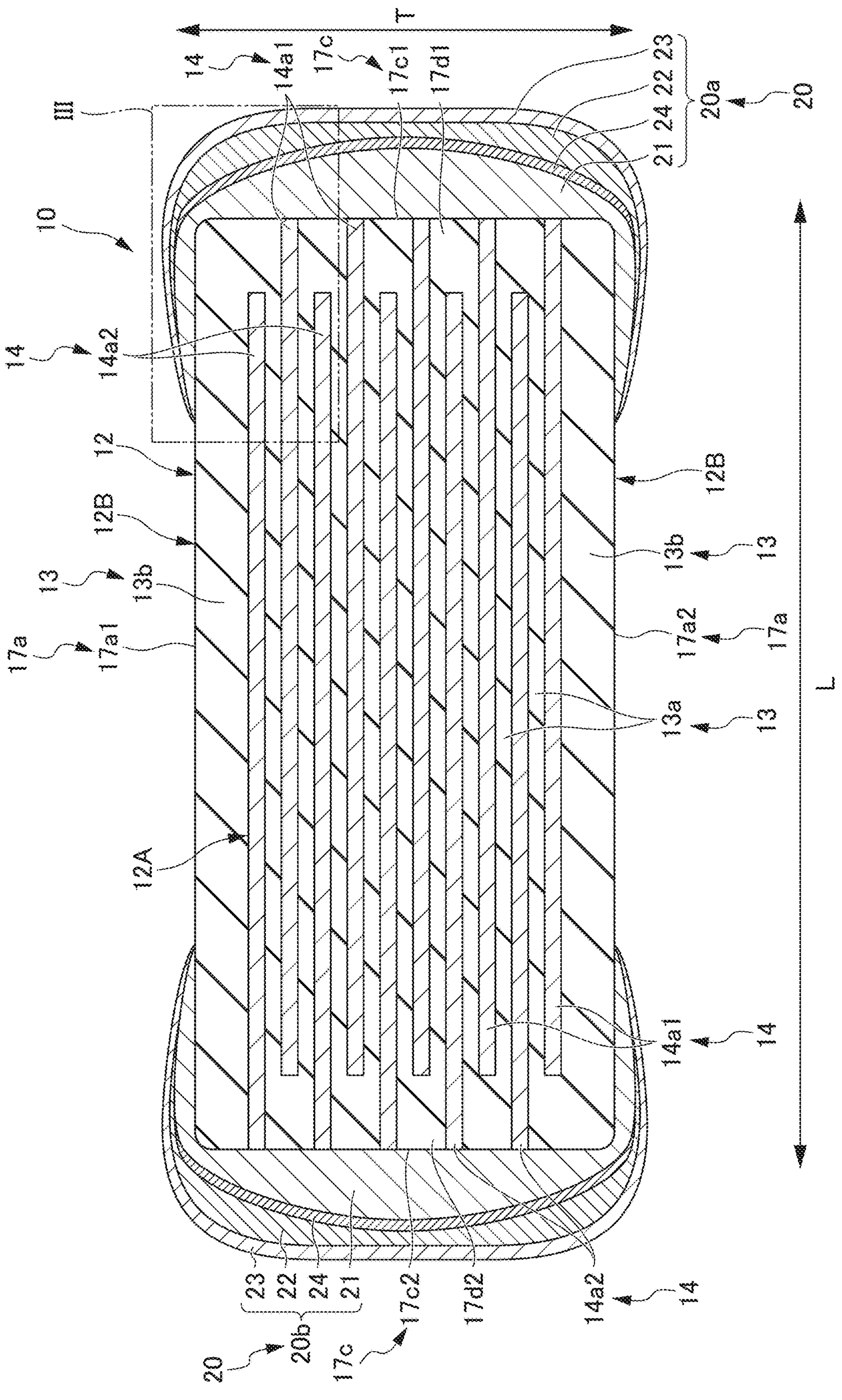
FIG. 2 is a cross-sectional view taken along the line II-II of FIG. 1.

Hereinafter, preferred embodiments of the present invention will be described with reference to the drawings. FIG. 1 is a schematic perspective view of a multilayer ceramic capacitor 10 according to a preferred embodiment of the present invention. FIG. 2 is a cross-sectional view taken along the line II-II shown in FIG. 1.

As shown in FIG. 1, the multilayer ceramic capacitor 10 according to a preferred embodiment of the present invention has a rectangular or substantially rectangular parallelepiped shape. The multilayer ceramic capacitor 10 includes a multilayer body 12 and a pair of external electrodes 20 spaced apart from each other.

In FIG. 1, the arrow T indicates a lamination (stacking) direction of the multilayer ceramic capacitor 10 and a multilayer body 12. In FIGS. 1 and 2, the arrow L indicates a length direction orthogonal or substantially orthogonal to the lamination direction T of the multilayer ceramic capacitor 10 and the multilayer body 12. In FIG. 1, the arrow W indicates a width direction of the multilayer ceramic capacitor 10 and the multilayer body 12 orthogonal or substantially orthogonal to the lamination direction T and the length direction L. The cross-sectional view shown in FIG. 2 shows a cross section LT, which is a cross section taken along the length direction L and the lamination direction T at the center in the width direction W.

As shown in FIGS. 1 and 2, the multilayer body 12 includes a pair of main surfaces 17*a* opposed to each other in the lamination direction T, a pair of side surfaces 17*b* opposed to each other in the width direction W, and a pair of end surfaces 17*c* opposed to each other in the length direction L. The pair of main surfaces 17*a* include a first main surface 17*a*1 and a second main surface 17*a*2 opposed to the first main surface 17*a*1 in the lamination direction T. The pair of side surfaces 17*b* include a first side surface 17*b*1 and a second side surface 17*b*2 opposed to the first side surface 17*b*1 in the width direction W. The pair of end surfaces 17*c* include a first end surface 17*c*1 and a second end surface 17*c*2 opposed to the first end surface 17*c*1 in the length direction L. In the following description, one end portion of the multilayer body 12 in the length direction L on the first end surface 17*c*1 is referred to as an end portion 17*d*1 on the first end surface, and the other end portion of the multilayer body 12 in the length direction L on the second end surface 17*c*2 is referred to as an end portion 17*d*2 on the second end surface.

The dimensions of the multilayer ceramic capacitor 10 are preferably, for example, about 0.2 mm or more and about 1.2 mm or less in the length direction L, about 0.1 mm or more and about 0.7 mm or less in the width direction W, and about 0.1 mm or more and about 0.7 mm or less in the lamination direction T.

The pair of external electrodes 20 includes a first external electrode 20*a* provided at the end portion 17*d*1 on the first end surface and a second external electrode 20*b* provided at the end portion 17*d*2 on the second end surface. The first external electrode 20*a* covers the first end surface 17*c*1, and the second external electrode 20*b* covers the second end surface 17*c*2.

As shown in FIG. 2, the multilayer body 12 includes a plurality of dielectric ceramic layers 13 and a plurality of internal electrode layers 14 alternately laminated along the lamination direction T. Furthermore, the multilayer body 12 includes an inner layer portion 12A in which the plurality of internal electrode layers 14 are opposed to each other with a first dielectric ceramic 13*a* layer described later interposed therebetween, and a pair of outer layer portions 12B that sandwich the inner layer portion 12A in the lamination direction T.

The dielectric ceramic layer 13 is formed by firing, for example, a ceramic material including barium titanate as a main component. The internal electrode layer 14 is made of, for example, a metal material such as Ni, Cu, Ag, Pd, a Ag—Pd alloy, or Au, or other electrically conductive materials.

As shown in FIG. 2, the plurality of internal electrode layers 14 includes a plurality of first internal electrode layers 14*a*1 and a plurality of second internal electrode layers 14*a*2. The first internal electrode layer 14*a*1 and the second internal electrode layer 14*a*2 are alternately laminated with the dielectric ceramic layer 13 interposed therebetween.

The thickness of the internal electrode layer 14 is, for example, about 0.3 μm or more and about 0.4 μm or less. By setting the thickness of the internal electrode layer 14 to about 0.3 μm or more, defects such as electrode disconnection are reduced or prevented. Furthermore, by setting the thickness of the internal electrode layer 14 to about 0.4 μm or less, it is possible to reduce or prevent a decline in the ratio occupied by the dielectric layers in the capacitor and a decline in capacitance due to the decrease.

At the first end surface 17*c*1 of the multilayer body 12, an end surface on one end in the length direction L of each of the plurality of first internal electrode layers 14*a*1 is exposed, such that the first external electrode 20*a* is in contact with these end surfaces, leading to the electrical connection therebetween. At the second end surface 17*c*2 of the multilayer body 12, an end surfaces on the other end in the length direction L of each of the plurality of second internal electrode layers 14*a*2 is exposed, such that the second external electrode 20*b* is in contact with these end surfaces, leading to the electrical connection therebetween. Thus, a structure in which a plurality of capacitor elements are electrically connected in parallel is provided between the first external electrode 20*a* and the second external electrode 20*b*.

As shown in FIG. 2, the dielectric ceramic layers 13 include a plurality of first dielectric ceramic layers 13*a*, each sandwiched between the first internal electrode layer 14*a*1 and the second internal electrode layer 14*a*2, and a pair of second dielectric ceramic layers 13*b* provided at both ends in the lamination direction T and having a thickness larger than that of the first dielectric ceramic layer 13*a*.

The thickness of the first dielectric ceramic layer 13*a* is, for example, about 0.10 μm or more and about 1.00 μm or less. By setting the thickness of the first dielectric ceramic layer 13*a* to about 0.10 μm or more, it is possible to reduce or prevent deterioration of the insulation characteristics and to improve reliability. On the other hand, by setting the thickness of the first dielectric ceramic layer 13*a* to about 1.00 μm or less, it is possible to reduce the thickness of the first dielectric ceramic layer 13*a* and to improve the capacitance. Furthermore, the number of the first dielectric ceramic layers 13*a* is, for example, 100 or more and 900 or less.

The multilayer ceramic capacitor 10 is manufactured, for example, by laminating a material defining and functioning as the dielectric ceramic layer 13 and the internal electrode layer 14 to form the multilayer body 12, firing each material defining and functioning as the multilayer body 12, and then forming the external electrodes 20.

The multilayer body 12 is manufactured, for example, by the following method. An internal electrode pattern is formed by printing a conductive paste functioning as the internal electrode layer 14 on the surface of a ceramic green sheet having a thickness of, for example, about 0.6 μm or more and about 1.2 μm or less and functioning as the dielectric ceramic layer 13. The thickness of the internal electrode pattern is, for example, about 0.6 μm or more and about 2.0 μm or less.

A predetermined number of ceramic green sheets for the inner layer portion 12A including the internal electrode pattern provided thereon are laminated, and then, ceramic green sheets for the outer layer portions 12B are laminated on both end surfaces in the lamination direction T to obtain a laminated sheet. This laminated sheet is pressed in the lamination direction to press the ceramic green sheets together to obtain a laminated mother block. Next, the laminated mother block is divided into chips by dicing or extrusion to obtain a plurality of chips. The obtained chips are fired under a predetermined condition to obtain the multilayer body 12. In addition, thereafter, the multilayer body 12 may be polished by a method such as barrel polishing.

As shown in FIGS. 1 and 2, the first external electrode 20*a* is provided at the end portion 17*d*1 on the first end surface of the multilayer body 12, and the second external electrode 20*b* is provided at the end portion 17*d*2 on the second end surface of the multilayer body 12. The first external electrode 20*a* and the second external electrode 20*b* include conductive films having the same structure. Hereinafter, when the first external electrode 20*a* and the second external electrode 20*b* are described without being distinguished from each other, both of them may be referred to as an external electrode 20.

As shown in FIG. 2, the external electrode 20 of a preferred embodiment includes a first external electrode layer 21, a second external electrode layer 22 provided on the first external electrode layer 21, a plated layer 23 provided on the second external electrode layer 22, and an interface region 24 between the first external electrode layer 21 and the second external electrode layer 22. The first external electrode layer 21 and the second external electrode layer 22 are both formed by, for example, firing. Here, the interface does not necessarily refer to a boundary line, and may refer to a region across the first external electrode layer 21 and the second external electrode layer 22, and may include both regions, or may include a region between the first external electrode layer 21 and the second external electrode layer 22.

The first external electrode layer 21 is a conductive film including, for example, Ni as a main component, and covers the first end surface 17*c*1 and the second end surface 17*c*2 of the multilayer body 12. The first external electrode layers 21 are each in direct contact with the end surfaces of the internal electrode layers 14 exposed at each of the first end surface 17*c*1 and the second end surface 17*c*2, to provide the electrical connection therebetween. At the end portion 17*d*1 on the first end surface, the first external electrode layer 21 covers the entire surface of the first end surface 17*c*1, and extends over the four surfaces of the first main surface 17*a*1 and the second main surface 17*a*2 opposed to each other and the first side surface 17*b*1 and the second side surface 17*b*2 opposed to each other. The same applies to the end portion 17*d*2 on the second end surface. That is, at the end portion 17*d*2 on the second end surface, the first external electrode layer 21 covers the entire or substantially the entire surface of the second end surface 17*c*2, and extends over the four surfaces of the first main surface 17*a*1 and the second main surface 17*a*2 opposed to each other and the first side surface 17*b*1 and the second side surface 17*b*2 opposed to each other.

The second external electrode layer 22 is an electrically conductive film including, for example, Cu as a main component, and is provided on the first external electrode layer 21 to cover the first external electrode layer 21. The second external electrode layer 22 covers at least a portion of the first external electrode layer 21 that covers each of the first end surface 17*c*1 and the second end surface 17*c*2. The second external electrode layer 22 may cover the entire or substantially the entire surface of the first external electrode layer 21. Furthermore, the second external electrode layer 22 may be provided such that, for example, a portion of an edge of the portion covering the first main surface 17*a*1, the second main surface 17*a*2, the first side surface 17*b*1, and the second side surface 17*b*2 of the first external electrode layer 21 is exposed.

In this specification, the meaning of Ni as a main component indicates that the component of Ni accounts for 50 wt % or more, and the meaning of Cu as a main component indicates that the component of Cu accounts for 50 wt % or more. That is, the first external electrode layer 21 includes 50 wt % or more of Ni, and the second external electrode layer 22 includes 50 wt % or more of Cu.

The plated layer 23 may have, for example, a single-layer structure including, for example, a Ni plated layer, a Sn plated layer, or the like, or a double-layer structure including, for example, a Sn plated layer on the Ni plated layer. The plated layer 23 is formed by, for example, a barrel plating method. In the barrel plating method, a plurality of multilayer bodies 12 including the second external electrode layer 22 provided thereon are placed and immersed in a plating solution in the barrel to form the plated layer 23 on the surface of the second external electrode layer 22 while rotating the barrel.

Figure 3:
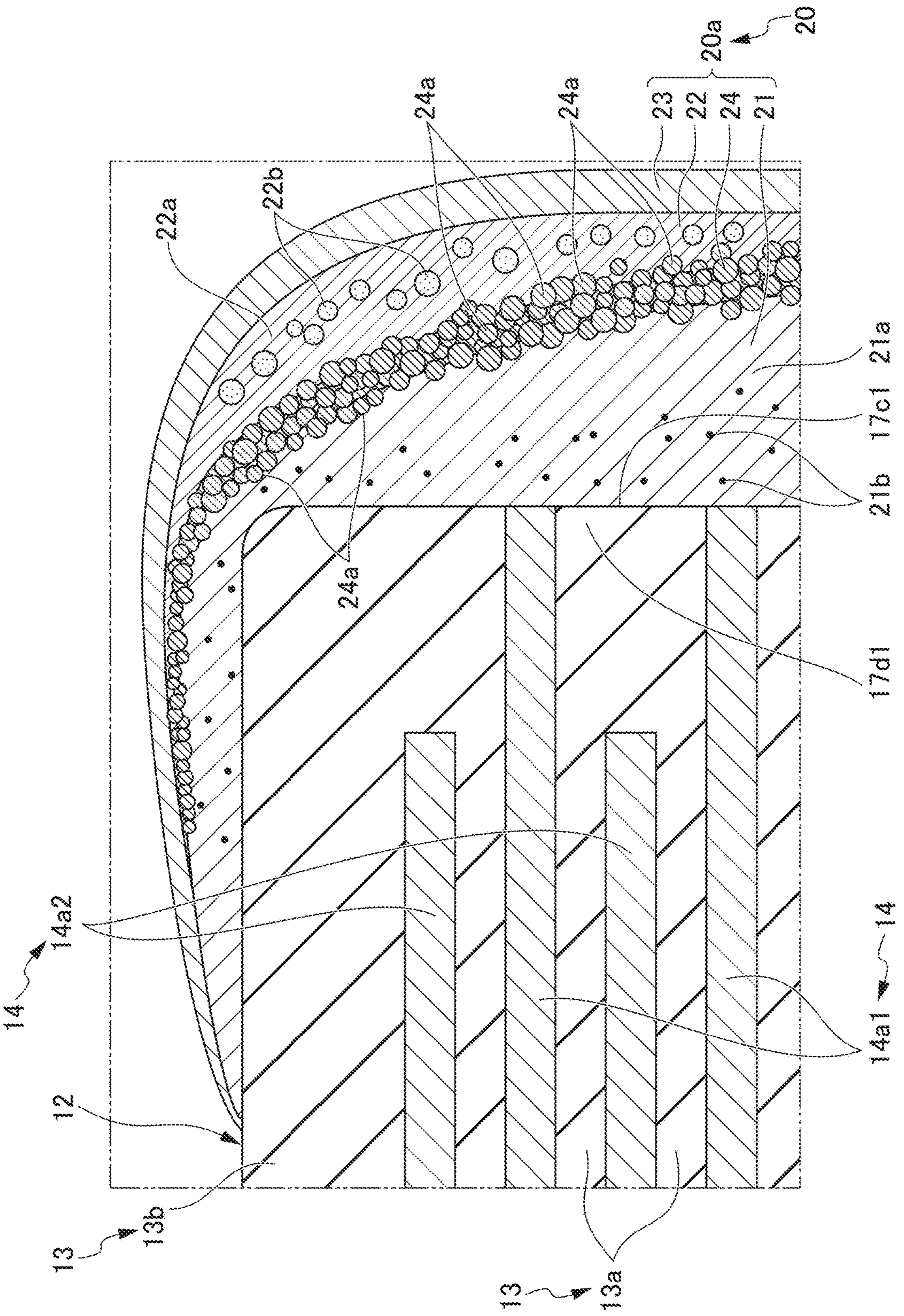
FIG. 3 is an enlarged view of a portion III in FIG. 2.

FIG. 3 is an enlarged view of the portion indicated by III in FIG. 2.

Although FIG. 3 shows the first external electrode 20*a* and the second external electrode 20*b* having the same configuration. Therefore, in the following description, the first external electrode 20*a* will be described as an example of the external electrode 20 with reference to FIG. 3.

As shown in FIG. 3, the first external electrode layer 21 includes dielectric particles 21*b* in a first metal component 21*a*. The dielectric particles 21*b* are an example of dielectric regions. The first metal component 21*a* includes Ni as a main component and includes a metal group 24*a* described later. The dielectric particles 21*b* are dispersed adjacent to the multilayer body 12 in the first metal component 21*a*. The dielectric particles 21*b* are particles of a ceramic material of the dielectric ceramic layer 13. The dielectric particles 21*b* migrate from the dielectric ceramic layer 13 into the first metal component 21*a* when the first external electrode layer 21 is fired to the multilayer body 12, such that the dielectric particles 21*b* are dispersed in the first external electrode layer 21. For example, when the first external electrode layer 21 is simultaneously fired together (cofired) with the multilayer body 12 and fired on the multilayer body 12, the amount of the dielectric particles 21*b* in the first external electrode layer 21 is larger than the amount in a case in which the first external electrode layer 21 is not simultaneously fired therewith.

As shown in FIG. 3, the second external electrode layer 22 includes glass 22*b* in a second metal component 22*a* including, for example, Cu as a main component. The glass 22*b* is, for example, a glass component including oxides such as silicic acid ($SiO_2$), alumina ($Al_2O_3$), titanium oxide ($TiO_2$), barium oxide ($BaO_2$), and zirconia ($ZrO_2$).

In a preferred embodiment of the present invention, as shown in FIG. 2, the interface region 24 is provided between the first external electrode layer 21 and the second external electrode layer 22. As shown in FIG. 3, the interface region 24 includes the metal group 24*a*. In a preferred embodiment, the interface region 24 shown in FIG. 2 refers to a region in which a large number of metal groups 24*a* shown in FIG. 3 are aggregated in layer configuration between the first external electrode layer 21 and the second external electrode layer 22. That is, the multilayer ceramic capacitor 10 of a preferred embodiment includes the metal group 24*a* at the interface between the first external electrode layer 21 and the second external electrode layer 22. The metal group 24*a* includes at least one of metals selected from Sn, In, Ga, Zn, Bi, Pb, Fe, V, Y, and Cu, for example. Here, a case where the metal group 24*a* includes one kind of metal is also referred to as the metal group 24*a*.

The metal group 24*a* included in the first external electrode layer 21 migrates to the surface opposite to the multilayer body 12 when the first external electrode layer 21 is fired on the multilayer body 12, such that the interface region 24 including the metal group 24*a* is formed. Accordingly, the metal group 24*a* also forms a solid solution in a region adjacent to the interface region 24 of the first external electrode layer 21.

Furthermore, as shown in FIG. 3, the metal group 24*a* forms a solid solution in the second metal component 22*a* of the second external electrode layer 22. Specifically, when the second external electrode layer 22 is fired on the already formed first external electrode layer 21, the metal group 24*a* in the interface region 24 migrates to the second external electrode layer 22, such that the metal group 24*a* forms a solid solution therein. The metal group 24*a* in the second external electrode layer 22 forms a solid solution in a region adjacent to the interface region 24.

In the multilayer ceramic capacitor 10 of a preferred embodiment, the concentration of the metal group 24*a* forming a solid solution in Cu included in the second external electrode layer 22 may be lower than the concentration of the metal group 24*a* forming a solid solution in Ni included in the first external electrode layer 21. It is presumed that the difference in concentration is because, when the second external electrode layer 22 is fired, the metal group 24*a* included in the first external electrode layer 21 is blocked by the already formed interface region 24 and the amount of the metal group 24*a* migrating to the second external electrode layer 22 is small.

The first external electrode layer 21 is formed, for example, by applying a conductive Ni paste including Ni powder to the end portion 17*d*1 on the first end surface and the end portion 17*d*2 on the second end surface of the multilayer body 12 and heating the conductive Ni paste at a predetermined firing temperature. As described above, the first external electrode layer 21 may be simultaneously fired (cofired) together with the multilayer body 12 to be fired on the multilayer body 12. The second external electrode layer 22 is formed, for example, by applying a conductive Cu paste including Cu powder onto the first external electrode layer 21, and heating the conductive Cu paste at a predetermined firing temperature.

Although the second external electrode layer 22 may be formed after the first external electrode layer 21 is formed, the first external electrode layer 21 and the second external electrode layer 22 may be formed simultaneously. In this case, the conductive Ni paste is applied to the multilayer body 12, and the conductive Cu paste is applied on the conductive Ni paste, and then fired at the same time.

According to the multilayer ceramic capacitor 10 of a preferred embodiment, when the plated layer 23 is formed by immersing the plated layer 23 in the plating solution as described above, it is assumed that the plating solution, i.e., moisture, infiltrates into the interior of the external electrode 20 from the surface of the plated layer 23. However, according to a preferred embodiment of the present invention, the infiltration of moisture is prevented by the metal group 24*a* of the interface region 24, and moisture hardly reaches the multilayer body 12. With such a configuration, for example, even when the plated layer 23 is formed from a plating solution, infiltration of the plating solution is reduced or prevented such that the quality is ensured.

The entire thickness of the external electrode 20 is, for example, about 10 μm or more and about 30 μm or less. Furthermore, the thickness of the first external electrode layer 21 is, for example, about 5 μm or more and about 15 μm or less, and the thickness of the second external electrode layer 22 is, for example, about 10 μm or more and about 20 μm or less.

Examples of a method of measuring the thicknesses of the first external electrode layer 21 and the second external electrode layer 22 include observing an LT cross section in the vicinity of the center in the width direction W of the multilayer body 12 exposed by polishing. Examples of a measuring instrument include a wavelength dispersive X-ray analyzer (WDX) or energy dispersive X-ray analyzer (EDX), and scanning electron microscope (SEM) or transmission electron microscope (TEM).

Furthermore, in the LT cross section, ten locations were measured between the first external electrode layer 21 and the second external electrode layer 22, and the average value was taken as a molar ratio. The thickness of the interface region 24 is preferably, for example, about 10 nm or more and about 80 nm or less. The reason for this is that it is possible to improve moisture resistance by providing the interface region 24. However, when the thickness of the interface region 24 is about 80 nm, the second external electrode layer 22 may be deteriorated.

The multilayer ceramic capacitor 10 according to the preferred embodiment described above has the following advantageous effects.

The multilayer ceramic capacitor 10 according to a preferred embodiment of the present invention includes the multilayer body 12 including the plurality of dielectric ceramic layers 13 and the plurality of internal electrode layers 14 laminated alternately in the lamination direction T, the pair of main surfaces 17*a* opposed to each other in the lamination direction T, the pair of side surfaces 17*b* opposed to each other in the width direction W orthogonal or substantially orthogonal to the lamination direction T, and the pair of end surfaces 17*c* which are opposed to each other in the length direction L orthogonal or substantially orthogonal to the lamination direction T and the width direction W, and the pair of external electrodes 20 provided at both ends of the multilayer body 12 in the length direction L to cover at least the pair of end surfaces 17*c*, and connected to the internal electrode layers 14, in which the pair of external electrodes 20 each include the first external electrode layer 21 that covers each of the end surfaces 17*c* and is connected to the internal electrode layers 14, the second external electrode layer 22 provided on the first external electrode layer 21, and the plated layer 23 on the second external electrode layer 22, the first external electrode layer 21 includes Ni and dielectric particles 21*b*, the second external electrode layer 22 includes Cu and glass 22*b*, and the metal group 24*b* including at least one metal selected from Sn, In, Ga, Zn, Bi, Pb, Fe, V, Y, and Cu is included at an interface between the first external electrode layer 21 and the second external electrode layer 22.

With such a configuration, since the metal group 24*a* prevents moisture from infiltrating, the multilayer ceramic capacitor 10 has sufficient moisture resistance by the external electrode 20.

In the multilayer ceramic capacitor 10 according to a preferred embodiment of the present invention, the metal group 24*a* forms a solid solution in the Ni included in the first external electrode layer 21.

This increases the density and thickness of the metal group 24*a*, thus further improving moisture resistance.

In the multilayer ceramic capacitor 10 according to a preferred embodiment of the present invention, the metal group 24*a* forms a solid solution in the Cu included in the second external electrode layer 22.

This increases the density and thickness of the metal group 24*a*, thus further improving moisture resistance.

In the multilayer ceramic capacitor 10 according to a preferred embodiment of the present invention, the concentration of the metal group 24*a* forming a solid solution in the Cu included in the second external electrode layer 22 is preferably lower than the concentration of the metal group 24*a* forming a solid solution in the Ni included in the first external electrode layer 21.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including at least one dielectric ceramic layers and at least one internal electrode layer laminated in a lamination direction, a pair of main surfaces opposed to each other in the lamination direction, a pair of side surfaces which are opposed to each other in a width direction orthogonal or substantially orthogonal to the lamination direction, a pair of end surfaces opposed to each other in a length direction orthogonal or substantially orthogonal to the lamination direction and the width direction; and a pair of external electrodes connected to the internal electrode layers; wherein at least one of the pair of external electrodes includes:

a first external electrode layer connected to the internal electrode layers; and a second external electrode layer on the first external electrode layer;

the second external electrode layer includes a glass component; and a metal group including at least one of Sn, In, Ga, Zn, Bi, Pb, Fe, V, or Y is included at an interface between the first external electrode layer and the second external electrode layer.

2. The multilayer ceramic capacitor according to claim 1, wherein the first external electrode layer includes Ni.

3. The multilayer ceramic capacitor according to claim 2, wherein the first external electrode layer includes a dielectric region.

4. The multilayer ceramic capacitor according to claim 2, the second external electrode layer includes Cu.

5. The multilayer ceramic capacitor according to claim 4, wherein the second external electrode layer includes the metal group.

6. The multilayer ceramic capacitor according to claim 2, wherein the first external electrode layer includes the metal group.

7. The multilayer ceramic capacitor according to claim 2, wherein the metal group defines a solid solution in the Ni.

8. The multilayer ceramic capacitor according to claim 4, wherein the metal group defines a solid solution in the Cu.

9. The multilayer ceramic capacitor according to claim 8, wherein a concentration of the metal group defining the solid solution in the Cu is lower than a concentration of the metal group defining the solid solution in the Ni.

10. The multilayer ceramic capacitor according to claim 1, wherein a thickness of the interface between the first external electrode and the second external electrode is about 10 nm or more and about 80 nm or less.

11. The multilayer ceramic capacitor according to claim 1, wherein the glass component included in the second external electrode layer includes at least one of Si, Al, Ti, Ba, or Zr.

12. A multilayer ceramic capacitor comprising:

a multilayer body including at least one dielectric ceramic layer and at least one internal electrode layer laminated in a lamination direction, a pair of main surfaces opposed to each other in the lamination direction, a pair of side surfaces which are opposed to each other in a width direction orthogonal or substantially orthogonal to the lamination direction, and a pair of end surfaces opposed to each other in a length direction orthogonal or substantially orthogonal to the lamination direction and the width direction; and a pair of external electrodes connected to the internal electrode layers; wherein at least one of the pair of external electrodes includes:

a first external electrode layer connected to the internal electrode layers; and a second external electrode layer on the first external electrode layer;

the first external electrode layer includes Ni and a metal group including at least one of Sn, In, Ga, Zn, Bi, Pb, Fe, V, or Y;

the second external electrode layer includes Cu and a glass component; and the metal group is included at an interface between the first external electrode layer and the second external electrode layer.

13. The multilayer ceramic capacitor according to claim 12, wherein the second external electrode layer includes the metal group.

14. The multilayer ceramic capacitor according to claim 12, wherein a thickness of the interface between the first external electrode and the second external electrode is about 10 nm or more and about 80 nm or less.

15. The multilayer ceramic capacitor according to claim 12, wherein the metal group defines a solid solution in the Ni.

16. The multilayer ceramic capacitor according to claim 15, wherein the metal group defines a solid solution in the Cu.

17. The multilayer ceramic capacitor according to claim 16, wherein a concentration of the metal group defining the solid solution in the Cu is lower than a concentration of the metal group defining the solid solution in the Ni.

18. A multilayer ceramic capacitor comprising:

a multilayer body including at least one dielectric ceramic layer and at least one internal electrode layer laminated in a lamination direction; and a pair of external electrodes on the multilayer body and connected to the at least one internal electrode layer; wherein at last one of the pair of external electrodes includes:

a first external electrode layer connected to the at least one internal electrode layers; and a second external electrode layer on the first external electrode layer;

the first external electrode layer includes Ni and a metal group including at least one of Sn, In, Ga, Zn, Bi, Pb, Fe, V, or Y; and the second external electrode layer includes Cu, a glass component, and a metal group including at least one of Sn, In, Ga, Zn, Bi, Pb, Fe, V, or Y.

19. The multilayer ceramic capacitor according to claim 18, wherein the glass component included in the second external electrode layer includes at least one of Si, Al, Ti, Ba, or Zr.

* * * * *